United States Patent [19]

Wade

[11] 4,000,922
[45] Jan. 4, 1977

[54] COLLAPSIBLE CARRIER FOR KEGS

[76] Inventor: John A. Wade, 244 Edgeford Drive, Pratt, Kans. 67124

[22] Filed: Nov. 5, 1975

[21] Appl. No.: 629,141

Related U.S. Application Data

[63] Continuation of Ser. No. 517,515, Oct. 24, 1974, abandoned.

[52] U.S. Cl. .................................. 294/16; 294/113
[51] Int. Cl.² ......................................... B66C 1/44
[58] Field of Search ............. 294/15, 16, 28, 31.2, 294/90–92, 106, 113; 24/249 R, 249 PC, 249 DP; 224/45 P, 45 C; 254/29 R, 30

[56] References Cited

UNITED STATES PATENTS

| | | | |
|---|---|---|---|
| 140,364 | 7/1873 | Griffing | 294/15 |
| 170,599 | 11/1875 | Small | 294/15 |
| 189,688 | 4/1877 | Bogert et al. | 294/113 |
| 296,666 | 4/1884 | Bowden | 294/113 |
| 964,432 | 7/1910 | Kemmler | 294/113 |
| 2,218,845 | 10/1940 | Kiggins | 294/16 |
| 2,749,173 | 6/1956 | Peterson | 294/113 |

*Primary Examiner*—Johnny D. Cherry
*Attorney, Agent, or Firm*—Glenn K. Robbins

[57] ABSTRACT

A collapsible carrier for kegs and the like. The carrier is in the form of a ring-like clamp comrised of semicircular ring members piovted on opposite sides of the clamp and opening to fit around a keg or barrel. Handle bars are provided at opposite sides and when they are lifted the clamp is closed and upwardly directed toothlike gripping members are caused to engage the keg in firm gripping engagement. The handle, ring members and gripping teeth are formed in a special angular relationship to provide an I-beam type strength to the ring members and self-clamping force through the lifting action on the handles. When not in use the carrier can be collapsed together to half its expanded size as a convenience in storage.

1 Claim, 6 Drawing Figures

COLLAPSIBLE CARRIER FOR KEGS

This is a continuation, of application Ser. No. 517,515, filed Oct. 24, 1974, now abandoned.

SUMMARY OF THE INVENTION

The present invention relates to a collapsible carrier for kegs or the like. The invention is particularly directed to heavy kegs or barrels that are because of their size or weight difficult for one man to handle. For an example in the railroad industry kegs of track bolts and spikes weigh 200 pounds. Such kegs constructed of sheet metal or wood are not only difficult to transport but represent a very severe safety hazard to workers who can suffer serious injury to leg and feet and back.

By means of the instant invention there has been provided a rugged yet simply constructed collapsible carrier in the nature of a pivoted ring-like frame which is adapted to fit over varied diametered kegs. The rim clamp is constructed of two semi-circular ring-like members pivoted together which is adapted to fit over the keg by means of upwardly directed teeth grip and engage the keg when a handle bar means extending on both sides of the clamp is lifted upwardly. Thus for either one man or for large kegs two men, a simple lifting up on the opposed handle bars and slight movement toward one another cause the ring members to pivot together and engage the keg and grip it in clamping relation. The keg can be then moved from one place to another as desired.

The keg carrier made in the form of the ring clamp with the semi-circular ring member half portions pivoted together can be simply collapsed for easy storage. The two half ring members are folded or pivoted together to cause the handle bar means extending from the ring members to engage one another where the collapsed carrier can be carried to the position of next use or stored as desired. The ring members are of an I-beam construction to give additional strength and provide a very rugged carrier that can be simply and expeditiously used.

The above features are objects of this invention and further objects will appear in the detailed description which follows and will be otherwise apparent to those skilled in the art.

For the purpose of illustration of this invention there is shown in the accompanying drawings a preferred embodiment thereof. It is to be understood that these drawings are for the purpose of illustration only and that the invention is not limited thereto.

IN THE DRAWING

DESCRIPTION OF THE INVENTION

Figure 1:
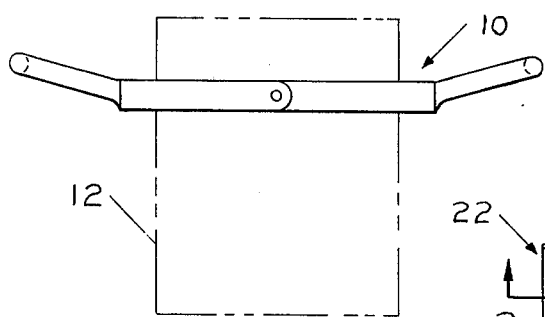
FIG. 1, is a view in side elevation of the expanded clamp fitting over a keg shown in dotted lines.

The ring clamp of this invention is generally indicated by the reference numeral 10 in the drawings. It is shown for use with a keg indicated in dotted lines by numeral 12.

The principal parts of the clamp 10 are a ring clamp 14 comprised of semi-circular pivoted ring members 16 and 18, gripping members 20 in the form of upwardly directed teeth and a pair of handle bars 22. Pivot means 24 provide for pivoting of the semi-circular ring members to a fully expanded position, a keg carrying position and a fully collapsed position for storage.

The ring clamp 14 is constructed of the two semi-circular members 16 and 18. These ring members are generally of a rim-like construction connected together by pivot pins 24. The ring members 16 and 18 have an I-beam thickness so that they have longer vertical dimension than horizontal dimension as best shown by reference to FIG. 3, to provide for added strength.

Figure 6:
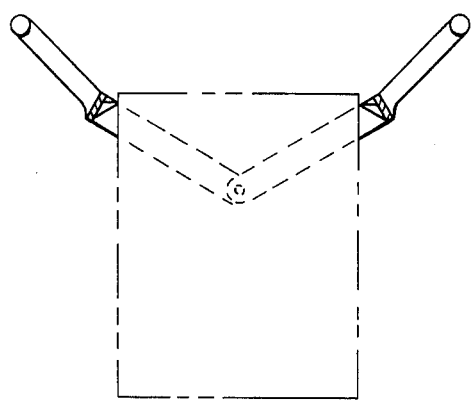
FIG. 6, is a view in section taken on the line 6—6 of FIG. 5.
Figure 3:
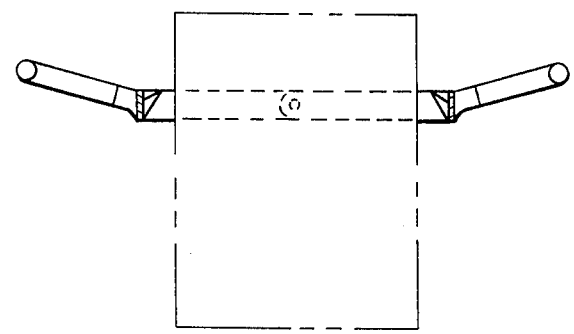
FIG. 3, is a view in section taken on the line 3—3 of FIG. 2.

The tooth like members 20 which act as a gripping means are best shown in FIGS. 3 and 6. In the fully expanded position of the ring clamp as shown in FIG. 3, the teeth are upwardly directed at some 30° from the horizontal. This ensures that when the ring clamp is partially closed to the keg engaging position as shown in FIG. 6, the teeth are still directed slightly above the horizontal so that they dig into the keg to prevent slippage. The teeth are conventionally affixed to the ring members 16 and 18 by welding and are connected at the middle portion of the ring members in order that they engage the keg when the ring members are pivoted towards one another in the keg lifting operation.

Figure 2:
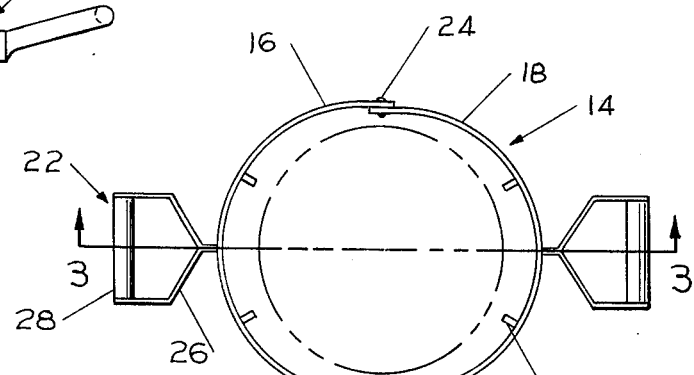
FIG. 2, is a top plan view taken of FIG. 1.

The handle bar means is best shown in FIGS. 1, 2 and 3. A generally Y-shaped support 26 is welded to the middle portion of each of the ring members and extends upwardly as shown in FIG. 3, about 15° above horizontal when the clamp is fully expanded. This ensures that when the clamp is partially collapsed to the keg carrying position, the handle bar does not approach too closely to the keg which might cause the hand of the operator to be pinched. A handle bar or grip 28 is connected to handle bar support 26 to provide a convenient grasping handle for the operator. The handle bar extends parallel to the pivot pins 24 which provides an ease in opening and closing the clamp. Further the positioning of the handle bar 28 parallel to the pivot pins provides a means for balancing the weight of the keg carried by the clamp and resist sudden changes in load shifting within the keg should this be encountered.

Use:

The keg carrier 10 of this invention is adapted for extremely simple use in operation. It will be understood that the carrier when not in use can be collapsed by closing or folding the ring members to the point where the handle bars touch one another. The collapsed carrier can then be carried by one hand fitting around both handles and can be simply stored as in the back of a car or the like.

When desired to be used the carrier is fully expanded to the position shown in FIGS. 1, 2 and 3. The carrier is then fitted over a keg in the position shown in FIGS. 1 and 3.

Figure 4:
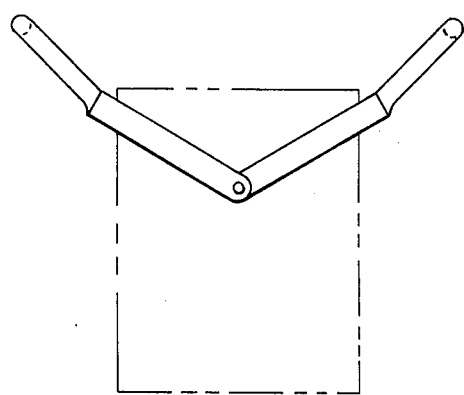
FIG. 4, is a view in side elevation taken similarly to FIG. 1, but showing the ring clamp in the clamped position.
Figure 5:
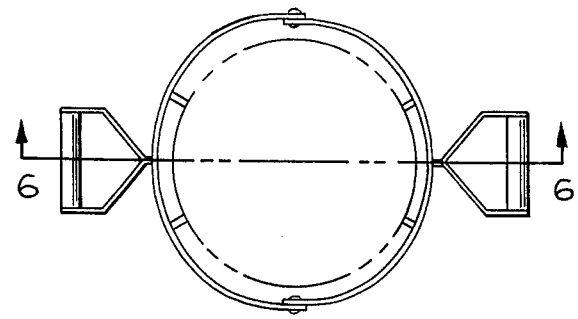
FIG. 5, is a top plan view taken of FIG. 4.

The clamping of the carrier to the keg is then simply effected by moving the handles toward one another to effect the clamping operation shown in FIGS. 4 and 6. In this operation the gripping teeth 20 dig into the side of the keg and prevent slippage. The keg is then ready to be carried from one place to another or lifted to any point desired by merely raising up on the handles and carrying the keg. When the carrying operation has been completed the handles are moved downwardly to expand the ring carrier which is then removed and either collapsed for storage or otherwise used to carry another keg or receptacle as desired.

Although the tool can be considered for manual application, it is versatile and with the use of a small chain or cable looped through both handles, the keg can safely be transported by all types of small cranes, the handler machines, back hoes etc. causing no injury to the keg itself and no slippage. Such kegs are usually smashed or slip out of conventional crane and tie-handler tongs.

What is claimed is:

1. A collapsible carrier for metal kegs and other receptacles having a cylindrical configuration, said carrier comprising a collapsible ring clamp having a diameter slightly larger than said keg adapted to grip the exterior of said keg, said clamp comprising a pair of semi-circular rigid ring like split members pivoted together and being collapsible from an expanded circular position to a collapsed position in general registry with one another, handle bar means extending outwardly from a middle portion of each of said split rings and keg gripping means consisting of tooth-like members extending inwardly from each of said split rings and being directed upwardly at a sufficient acute angle above the horizontal when the split ring members are expanded to the fully opened position that when the split ring members are partially closed to the keg clamping position they are still directed at an acute angle slightly above the horizontal so that they dig into the keg to prevent slippage, the handle bar means being comprised of a handle bar member positioned in alignment with a medial portion of the ring-like members extending generally parallel to the axis of the pivot means connecting said ring-like members and being rigidly connected to a medial portion of said ring-like members by a rigid handle bar support, said support in the clamp open position extending outwardly and slightly upwardly and in the partially closed keg clamping position extending upwardly at a greater degree and outwardly to provide space between the handle bar and the keg for the hand of the user.

* * * * *